United States Patent [19]

Munter

[11] Patent Number: 5,093,830
[45] Date of Patent: Mar. 3, 1992

[54] SELF-SYNCHRONIZING SERIAL TRANSMISSION OF SIGNALING BITS IN A DIGITAL SWITCH

[75] Inventor: Ernst A. Munter, Kanata, Canada

[73] Assignee: Northern Telecom Limited, Montreal, Canada

[21] Appl. No.: 548,800

[22] Filed: Jul. 6, 1990

[51] Int. Cl.$^5$ ............................................. H04J 3/12
[52] U.S. Cl. .................................... 370/99; 370/110.1
[58] Field of Search .................... 370/99, 100.1, 105.2, 370/105.4, 110.1; 375/113, 114

[56] References Cited

U.S. PATENT DOCUMENTS 4,606,056  8/1986  Perloff ................................... 370/99
4,760,973  7/1988  Calvignac et al. .................... 370/99

Primary Examiner—Douglas W. Olms
Assistant Examiner—Melvin Marcelo
Attorney, Agent, or Firm—F. P. Turpin

[57] ABSTRACT

Signaling bits (ABCD) from a plurality of channels are coded in a predetermined manner, multiplexed into a serial bit stream and transmitted on a data path. A receiver for the data includes a multiple level state machine adapted to decode and synchronize to the received coded signaling bits. Each level of the state machine is associated with a perspective type of signaling bit and the levels of the state machine are cascaded output to input. The existence of an output signal from the last stage of the state machine indicates the receiver is synchronized to the serial bit stream and thus the receiver is properly decoding and identifying the signaling bits.

8 Claims, 3 Drawing Sheets

SELF-SYNCHRONIZING SERIAL TRANSMISSION OF SIGNALING BITS IN A DIGITAL SWITCH

FIELD OF THE INVENTION

The invention relates generally to the transmission and reception of time division multiplexed channelized data and more particularly to a method of synchronizing to a serial data stream comprising coded signaling data.

BACKGROUND OF THE INVENTION

As is well known, digital telecommunication systems in North America communicate with each other using a standard basic format referred to as DS1 (e.g. T1 carrier system) or a multiple thereof wherein 24 voice channels are multiplexed into a 125 microsecond time period called a frame provided by a basic 8 kHz sampling rate. Each frame format provides for 24 channels each comprising one eight-bit word along with one frame bit. In telecommunications, signaling is a process of setting up a connection and supervising its completion as well as monitoring the sanity of the operating systems. In a DS1 data stream, signaling information is imbedded in the digital stream of bits representing the voice channels by using the least significant bit from each channel (8-bit word) in every 6th frame thus providing 24 bits every 6th frame which may be used as a signaling channel. This encoding scheme results in the use of only 7 bit words to encode the voice in those channels; however, the overall distortion is not significant. Signaling frames are provided for receiver synchronization and to indicate even and odd 6th frames thus providing a means for distinguishing between two types of signaling bits, "A" bits and "B" bits. A signaling frame in the "AB" signaling scheme is comprised of 12 frames. Frame 6 corresponds to the "A" signaling channel and frame 12 corresponds to the "B" signaling channel. Instances occur when more than two types of signaling bits are provided, as in the known extended "ABCD" signaling frame. In this signaling scheme, the "ABCD" signaling frame is a superframe comprised of 24 frames. Frames 6 and 12 correspond to the "A" and "B" signaling channels and frames 18 and 24 correspond to "C" and "D" signaling channels respectively. Generally the "A", "B", "C", and "D" signaling bits each carry a different type of signaling information.

An alternative transmission scheme (PCM-30) uses a 32 channel format with channels 0 and 16 being used as signaling channels. This transmission format uses a 16-frame signaling frame with channel 16 of each frame being partitioned in two parts each carrying one set of a, b, c, d signaling bits, and channel 0 being used to transmit other overhead information.

In contemporary telecommunication systems, it is sometimes desirable to provide an interface circuit to the carrier system for removing the signaling bits and channelizing them into a serial bit stream for further transmission along a single signal path.

As is generally known, there are numerous systems for the redundant encoding of binary data; however, none of them are suitable to provide self-synchronization to serially transmitted "ABCD" signaling bits.

This invention is directed to a method and apparatus for redundantly coding the channelized signaling bits before their channelized transmission as well as a method for decoding the received serial data stream in such a way that the "ABCD" signaling bits are properly regenerated and their association with the original channelized data is maintained.

Accordingly, it is an object of the invention to provide a system for the communication of channelized coded data which exhibits robust self-synchronizing characteristics.

It is a further object of the invention to provide a system which will recover synchronization when incorrectly coded data bits are transmitted.

SUMMARY OF THE INVENTION

In accordance with the invention, there is provided a method of coding periodically occurring series of signaling bits into a serial bit stream, comprising the steps of a) replicating the first bit of each series a predetermined number of times to yield a plurality of bits each having the same value; b) concatenating to the right of the plurality of bits a binary bit having the inverse value to that of the first bit; c) concatenating to the left of the plurality of bits a binary bit having a predetermined value; and d) coding each of the remainder bits of each series following the (a) and (b) steps above and replacing step (c) with the step of concatenating to the left of each plurality of bits resulting from step (b) a binary bit having a value inverse to said predetermined value.

Also in accordance with the invention, there is provided a circuit for receiving and extracting signaling bits from a data stream wherein the signaling bits are encoded as described above, the circuit for receiving and extracting signaling bits comprising a multiple level state machine wherein each level corresponds to one signaling bit to be extracted. Each level is responsive to the successful extraction of a signaling bit at a previous level for responding to the next available data from the data stream for extracting therefrom the next signaling bit. A successful extraction of a signaling bit from the last level of the state machine indicates that the receiving circuit is synchronized to the serial bit stream.

The invention permits the realization of a transmission system for serial time division multiplexed channelized data which exhibits self-synchronization between the receiver and the transmitter. The invention also permits the receiver to self-synchronize to the transmitter even if occasional errors are transmitted assuming correctly coded data is transmitted subsequent to the transmission of errors.

BRIEF DESCRIPTION OF THE DRAWINGS

An embodiment of the invention will now be described in conjunction with the drawings in which:

FIG. 1 shows a link interface circuit 10 connected to receive a T1 signal. The circuit 10 includes a signal decoder (not shown) adapted to extract the signaling bits from the T1 data stream and provide a signaling encoder circuit 20 with A,B,C, and D data streams. Of course, such signal decoders are well known since they are employed in conjunction with T1 data signals whenever the signaling data embedded therein needs to be stripped off. The circuit 20 is responsive to the four data streams for providing a serial coded signal for transmission to a decoding and synchronizing circuit 30. The decoding circuit 30 provides 4 distinct ABCD signaling channels which may then be deciphered as signaling data by a service controller and/or reinserted in a T1 data stream. As described further below, the signaling encoder circuit 20 performs data transformation on the ABCD signaling bits prior to transmission. Each of the signaling bits is encoded as six bits in a T1 system and as four bits in a PCM-30 environment; the only difference being in the number of replicated bits. These bits are used to ensure that the number of coded signaling bits is compatible with the size of the signaling channels of the two systems. In the described embodiment, the A-bit is replicated to yield four bits each having the same value. An inverse A-bit is then concatenated to the right side of the four bits and a zero bit is concatenated to the left side of the pair of A-bits. A then becomes 0 A A A A (A-inverse). The B, C, and D-bits are coded in the same manner as the A-bit except that, in each case, a one bit is concatenated to the left side of the four bits instead of a zero bit. Concatenating a bit to the left side of the replicated bits which is of a different binary state for the A-bit than for the B, C, and D bits generates coded data which may be decoded with respect to the coded bit to the left of the A-bit. The transmission of a series of A, B, C, D signaling bits is thus as follows: 0 A A A A (A-inverse) 1 B B B B (B-inverse) 1 C C C C (C-inverse) 1 D D D D (D-inverse). It therefore requires 24 bits to transmit 4 signaling bits serially in a time division channel. It should be realized that exchanging the one bits and the zero bits in each series of signaling data yields a data stream that is also recoverable by the receiving circuitry. Of course, the encoder circuit also includes circuitry to serialize and transmit the coded signaling data.

FIG. 2 illustrates a portion of the signaling encoder circuit 20 adapted to perform the encoding of an A signaling bit. A replicating circuit 22 receives the A-bit from the decoder circuit 10 and provides a right concatenating circuit 23 with four identical A-bits. The latter provides a left concatenating circuit 24 with five bits, the right most bit being the inverse of the replicated bits, and the circuit 24 concatenates thereto a bit having a predetermined binary value. Of course, the encoder circuit 20 also includes circuitry identical to circuits 22, 23 and 24 for the coding of B, C, and D bits.

Figure 1:
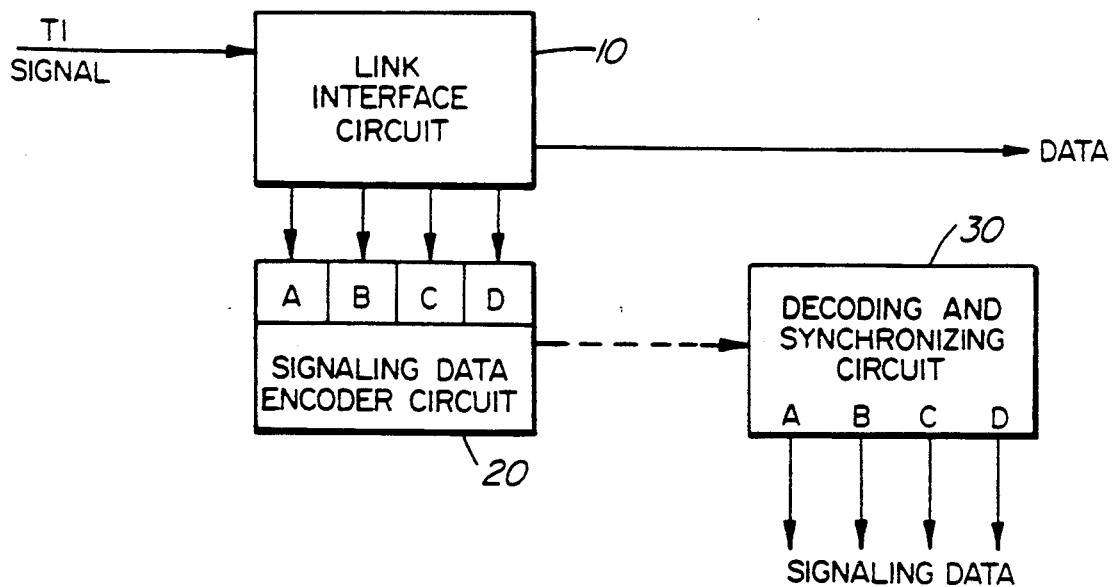
FIG. 1 is a block diagram of a transmission system that includes a circuit for extracting and encoding the signaling bits from a T1 signal into a coded serial stream of bits and a circuit for decoding the coded signal in accordance with the invention.
Figure 2:
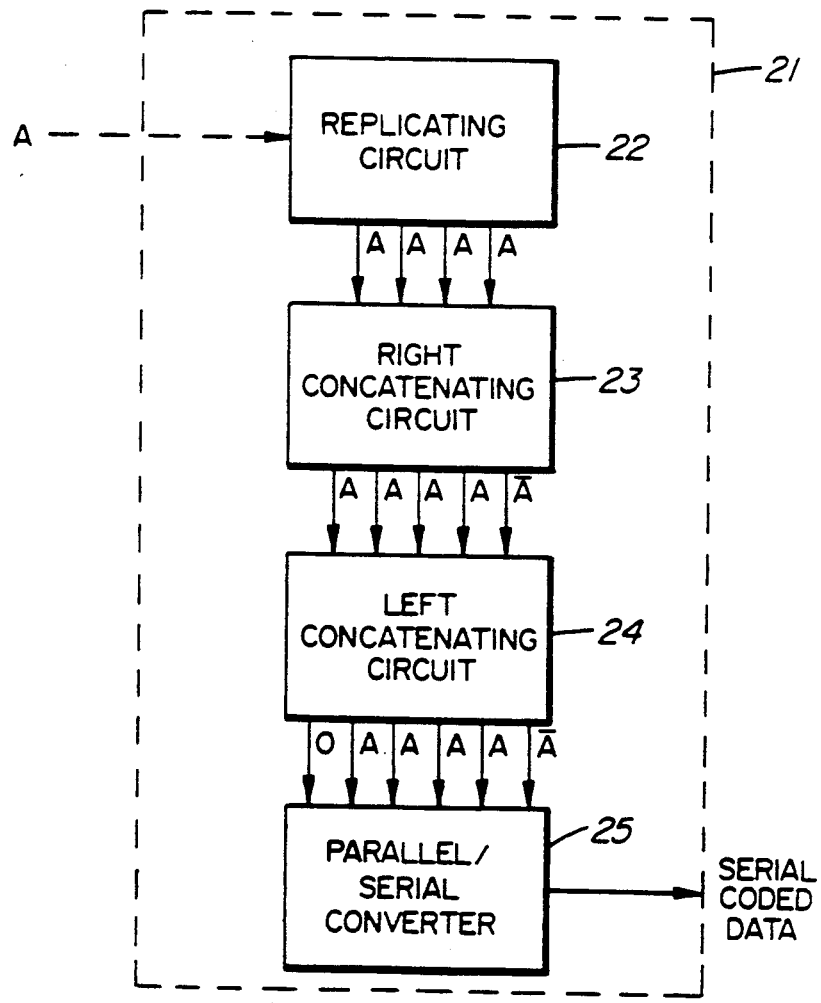
FIG. 2 is a block diagram of the signaling data encoder circuit shown in FIG. 1.

The output signals of the left concatenating circuits 24 are connected to a parallel-to-serial converter 25 for conversion of the coded data into serial coded data. Thus, the coded data corresponding to four signaling bits may be transmitted in a serial data stream corresponding to one T1 channel. It will of course be realized that circuits 22-25 may be implemented using very few logic gates; in fact, circuits 22 and 24 may consist of logic connections only whereas circuit 23 requires a single inverter gate for its implementation. The circuit 25 on the other hand may be a commercially available parallel/serial converter circuit. It will also be realized that the sequence of coding any one bit is not important. The same coded data may be achieved by changing the order of the coding steps illustrated in FIG. 2.

Figure 3:
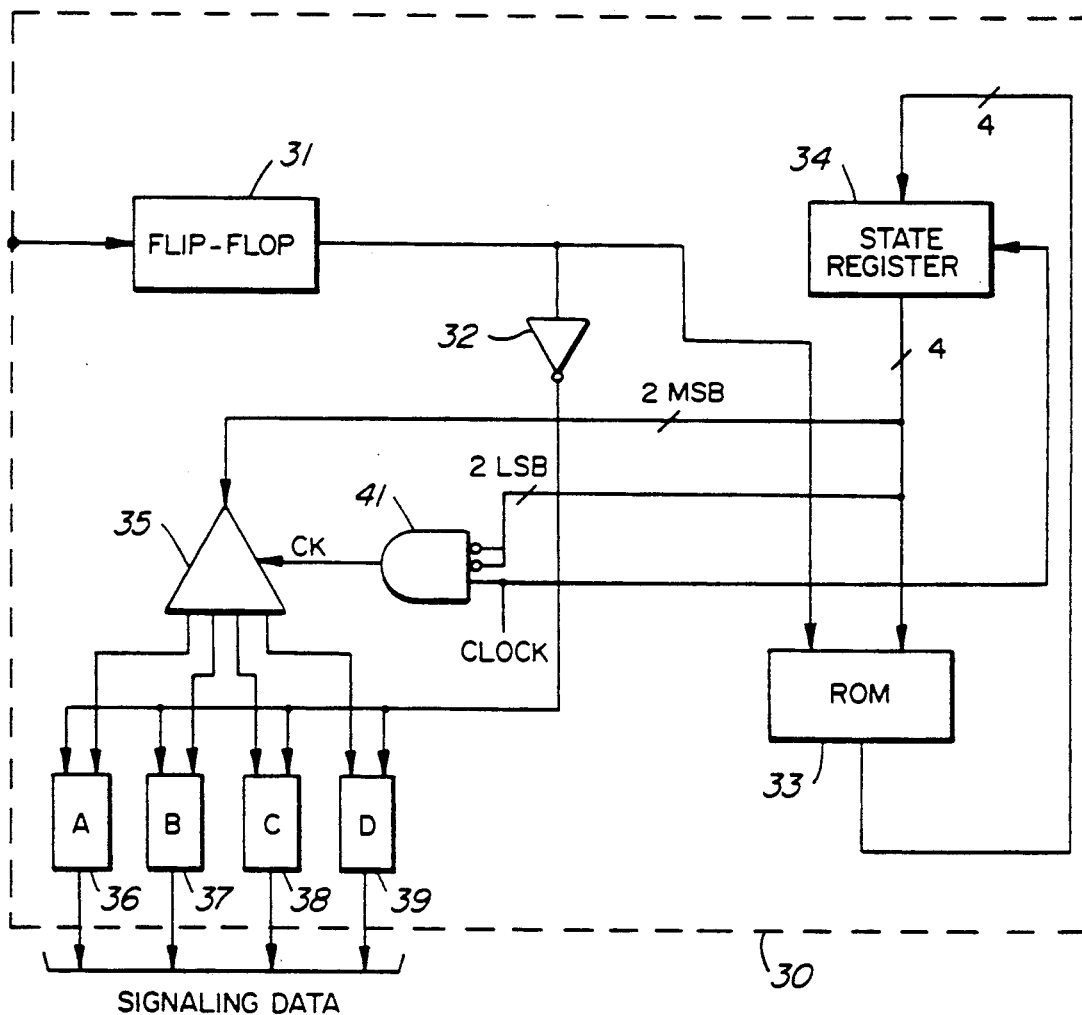
FIG. 3 is a logic block diagram of the decoding circuit shown in FIG. 1.

FIG. 3 is a logic diagram of the circuit 30 adapted to perform the decoding of the encoded signaling bit stream generated by the encoder circuit 20. A flip-flop 31 receives and temporarily stores each of the coded signaling bits as it is received at a receiving terminal. A logic circuit comprising a ROM 33 and a 4-bit state register 34 is responsive to each stored signaling bit and the previous content of the register for providing the state register 34 with a 4-bit signal corresponding to a next execution state. A selection circuit for selecting the signaling bits from the coded data stream comprises a binary decoder 35 and 4 one-bit latches 36, 37, 38, and 39. The binary decoder 35 is responsive to the two most significant bits of the 4-bit signal of the state register 34 and to a clock signal CK derived from the output of an AND gate 41 having as its input signals the two least significant bits of the 4-bit signal and an external clock signal to provide latches 36, 37, 38 and 39 with 4 distinct latch enable signals. The clock signal also serves to clock the state register 34. The latches 36, 37, 38 and 39 are also connected to the output of the flip-flop 31 through an inverter gate 32.

In operation, the flip flop 31 receives and stores each bit of the coded data and each signaling bit is used for selecting one of two memory banks (not shown) within the ROM 33. Read-only data coded within the ROM 33 forms a table to point to subsequent states in dependence upon the state of the input signals comprising the 4-bit signal and the stored value within the flip-flop 31. The state register 34 latches the value of the next execution state pointed to by the ROM 33. The output signals of the state register are used to address memory locations within the ROM 33 and a feedback path is formed between the ROM 33 and the state register 34. The two most significant bits of the output signals from register 34 are decoded by the binary decoder 35 to provide latch enable signals for the latches 36, 37, 38 and 39. Upon the assertion of one of the latch enable signals one of the latches stores the inverted current bit stored within the flip-flop 31. The bits stored in the latches 36, 37, 38 and 39 are available for use by service circuits or the like and/or may be inserted in a T1 data stream.

Figure 4:
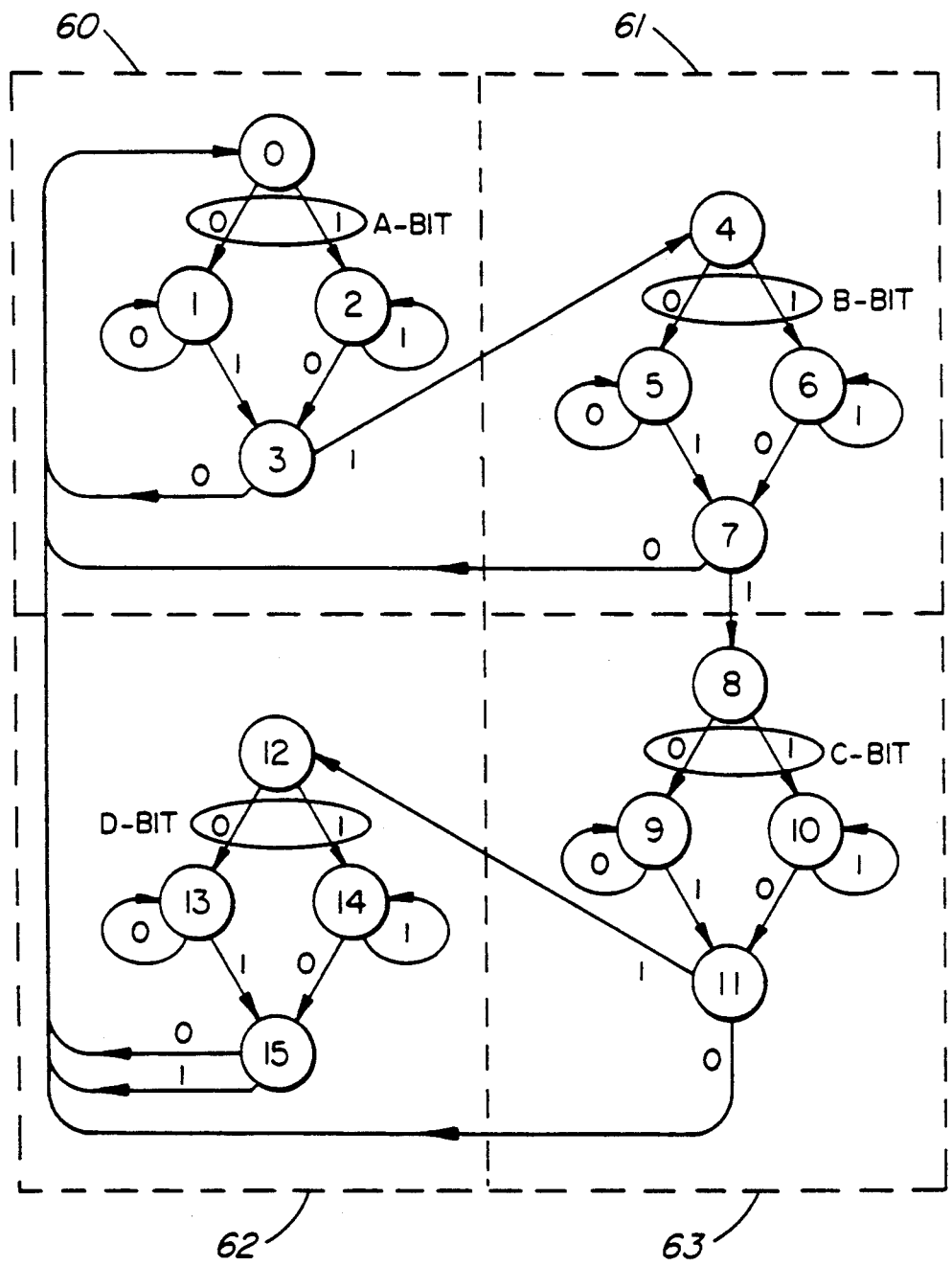
FIG. 4 is a state diagram depicting the operation of the decoding circuit of FIG. 3.

FIG. 4 is a state machine diagram illustrating the operation of the circuit shown in FIG. 3. Sixteen execution states are shown; states 0 through 14 each provide a pointer to a subsequent state and states 1, 2, 5, 6, 9, 10, 13 and 14 each provide an additional pointer to themselves when the value of the received bit in one of those states remains unchanged from the value upon entering that state. States 3, 7, and 11 each provide a pointer to subsequent states and also provide a pointer to state 0. The pointer to state 0 is the selected execution path when synchronization has not yet been achieved. State 15 provides a pointer to state 0. The system has synchronized when the value of the received bit in state 15 is a 1. Determining the binary value of the coded bit in state 15 allows one to know that the system is synchronized. Once the system has synchronized, the A, B, C, and D bits are latched in states 0, 4, 8, and 12 respectively. A 4-state logic state machine 60 is shown having a feedback execution path and, a feed-through execution path to a subsequent 4-state logic state machine 61. Of course, it should be realized that, in an "AB" signaling bit arrangement, eight execution states are required with state 7 providing a pointer to state 0. In such a system synchronization occurs when the value in state 7 is 1.

TABLE 1

| ADDR | REC'D BIT | STATE REG CURRENT | STATE REG NEXT | ADDR | REC'D BIT | STATE REG CURRENT | STATE REG NEXT |
|---|---|---|---|---|---|---|---|
| A 0 | 0 | 0 | 1 | A 16 | 1 | 0 | 2 |
| 1 | 0 | 1 | 1 | 17 | 1 | 1 | 3 |
| 2 | 0 | 2 | 3 | 18 | 1 | 2 | 2 |
| 3 | 0 | 3 | 0 | 19 | 1 | 3 | 4 |
| B 4 | 0 | 4 | 5 | B 20 | 1 | 4 | 6 |
| 5 | 0 | 5 | 5 | 21 | 1 | 5 | 7 |
| 6 | 0 | 6 | 7 | 22 | 1 | 6 | 6 |
| 7 | 0 | 7 | 0 | 23 | 1 | 7 | 8 |
| C 8 | 0 | 8 | 9 | C 24 | 1 | 8 | 10 |
| 9 | 0 | 9 | 9 | 25 | 1 | 9 | 11 |
| 10 | 0 | 10 | 11 | 26 | 1 | 10 | 10 |
| 11 | 0 | 11 | 0 | 27 | 1 | 11 | 12 |
| D 12 | 0 | 12 | 13 | D 28 | 1 | 12 | 14 |
| 13 | 0 | 13 | 13 | 29 | 1 | 13 | 15 |
| 14 | 0 | 14 | 15 | 30 | 1 | 14 | 14 |
| 15 | 0 | 15 | 0 | 31 | 1 | 15 | 0 |

Table 1 is a representation of programmed data within the ROM 33. The address column shows 32 memory locations each one being addressable by 5 address bits. Functionally, the 32 memory location are divided into two banks of 16 memory locations; each bank being selected in dependence upon the state of the output signal of the flip-flop 31 which is connected to the most significant address bit of the ROM 33. The output signals from the state register 34 address the 4 least significant address bits of the ROM 33 thereby providing an addressable range of 16 addresses in each bank of the ROM.

It is also possible to encode and decode the data using a commercially available microprocessor; however, encoding and decoding at the required speed may not be practicable. Numerous other modifications, variations and adaptations in particular, time multiplexing of the circuit to encode/decode signaling bits for all channels of one or several T1 signals may be made to the particular embodiment of the invention described above without departing from the scope of the claims.

I claim:

1. A method of coding periodically occurring series of signalling bits into a serial bit stream, comprising the steps of:
   a) replicating the first bit of each series a predetermined number of times to yield a plurality of bits each having the same value;
   b) concatenating to the right of the plurality of bits a binary bit having the inverse value to that of the first bit;
   c) concatenating to the left of the plurality of bits a binary bit having a predetermined value; and
   d) coding each of the remainder bits of each series following the (a) and (b) steps above and replacing step (c) with the step of concatenating to the left of each plurality of bits resulting from step (b) a binary bit having a value inverse to said predetermined value.

2. A circuit for coding periodically occurring series of signaling bits into a serial bit stream comprising:
   a) means for replicating the first bit of each series a predetermined number of times to yield a plurality of bits each having the same value;
   b) means for concatenating to the right of the plurality of bits a binary bit having the inverse value to that of the first bit;
   c) means for concatenating to the left of the plurality of bits a binary bit having a predetermined value; and
   d) means for coding each of the remainder bits of each series following the (a) and (b) steps above and replacing step (c) with the step of concatenating to the left of each plurality of bits resulting from step (b) a binary bit having a value inverse to said predetermined value.

3. A circuit for decoding the coded signaling bits coded by the method steps of claim 1 or the circuit for coding defined in claim 2, comprising:
   means for receiving and storing one of the coded signaling bits;
   a logic circuit including storage elements, said logic circuit being responsive to the stored signaling bit and to the binary state of the storage elements, for providing a plurality of output signals;
   a selection circuit for selecting an uncoded portion of the coded data, responsive to the output signals and a clock signal, said selection circuit providing a plurality of decoded data streams.

4. A circuit for decoding as defined in claim 3 wherein the means for receiving and storing comprises a flip-flop and where the storage elements comprise a register and a suitably programmed read-only-memory.

5. A method of decoding the data coded by the method steps of claim 1 or coded by the circuit defined in claim 2, the method comprising the steps of:
   a) receiving a first bit;
   b) receiving subsequent bits until a bit that is the binary inverse of the first bit is received;
   c) receiving a subsequent bit and comparing it to the predetermined binary value;
   d) repeating step (a) if the last received bit is equal to the predetermined binary value;
   e) receiving subsequent bits until a bit that is the binary inverse of the first bit is received;
   f) receiving a subsequent bit and comparing it to a predetermined binary value;
   g) repeating step (a) if the last received bit is equal to the predetermined binary value; and
   h) repeating step (a) if the number of channels is two.

6. A method of synchronizing to data coded by the method of claim 1, comprising the steps of:
   a) receiving a first bit;

b) receiving subsequent bits until a bit that is the binary inverse of the first bit is received;
c) receiving a subsequent bit and comparing it to the predetermined binary value;
d) repeating step (a) if the last received bit is equal to the predetermined binary value;
e) receiving subsequent bits until a bit that is the binary inverse of the first bit is received; and
f) receiving a subsequent bit and comparing it to a predetermined binary value corresponding to condition of synchronization.

7. A circuit for receiving an extracting signaling bits from a data stream wherein the signaling bits are encoded by the method of claim 1, the circuit comprising an input terminal for receiving the data stream, and a multiple level state machine having its input connected to the input terminal, each level of the state machine being responsive to the successful extraction of a signaling bit at a previous level for responding to the next available data from the data stream for extracting therefrom the next signaling bit, a successful extraction of a signaling bit from the last level of the state machine indicating that the receiving circuit is synchronized to the serial bit stream.

8. A circuit as defined in claim 7 wherein the state machine comprises, a logic circuit comprising a one-bit storage element for receiving and temporarily storing each bit of the data stream, a four-bit register and a read-only-memory addressable by the contents of the storage element and the register for providing a next content of the register; and a selection circuit responsive to the content of the storage element, a clock signal and the content of the register for selecting the signaling bits from the received data stream.

* * * * *